Aug. 17, 1948.  J. G. HORRIGAN  2,447,180
STOCK FEEDING MECHANISM FOR LATHES
Filed Oct. 2, 1944  2 Sheets-Sheet 1
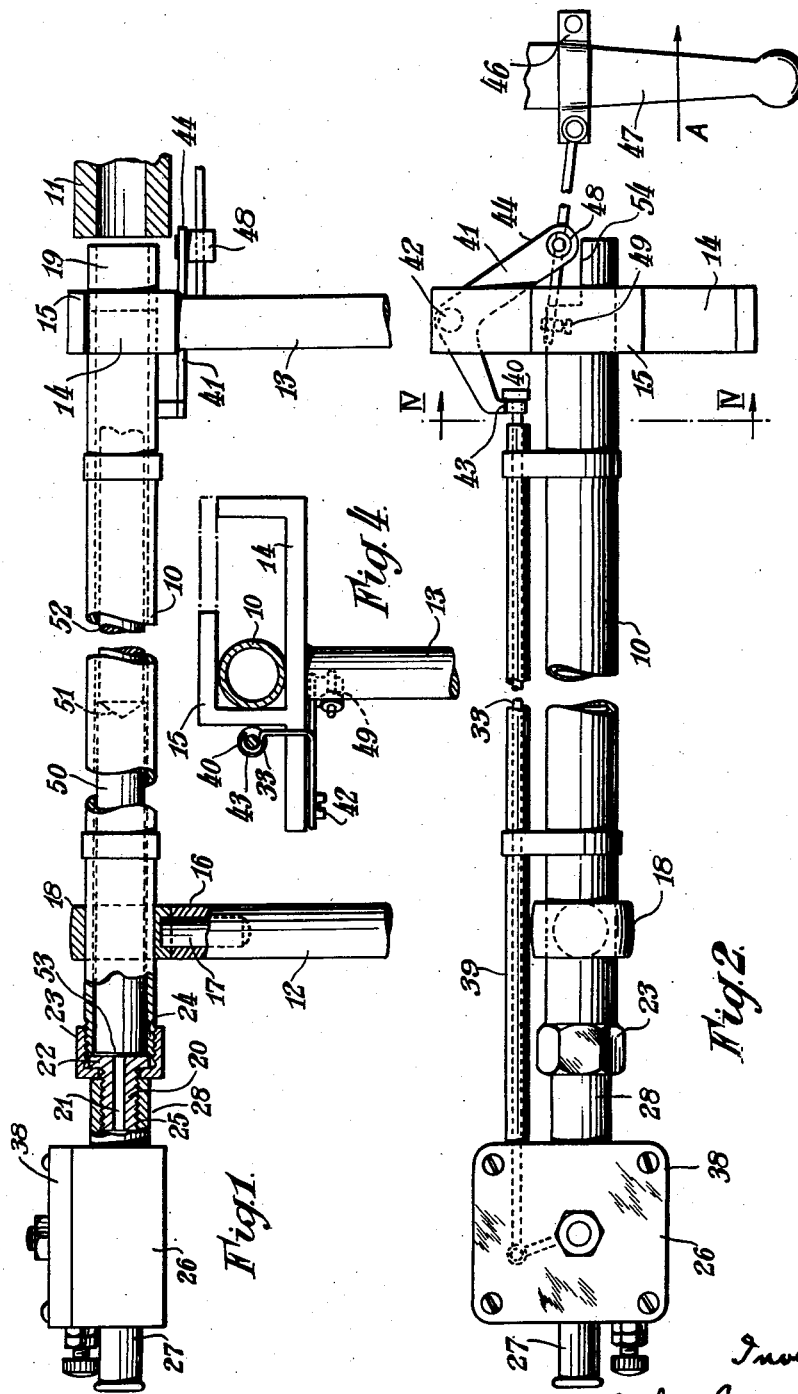
Inventor
John George Horrigan
by Stevens and Davis
his attorneys

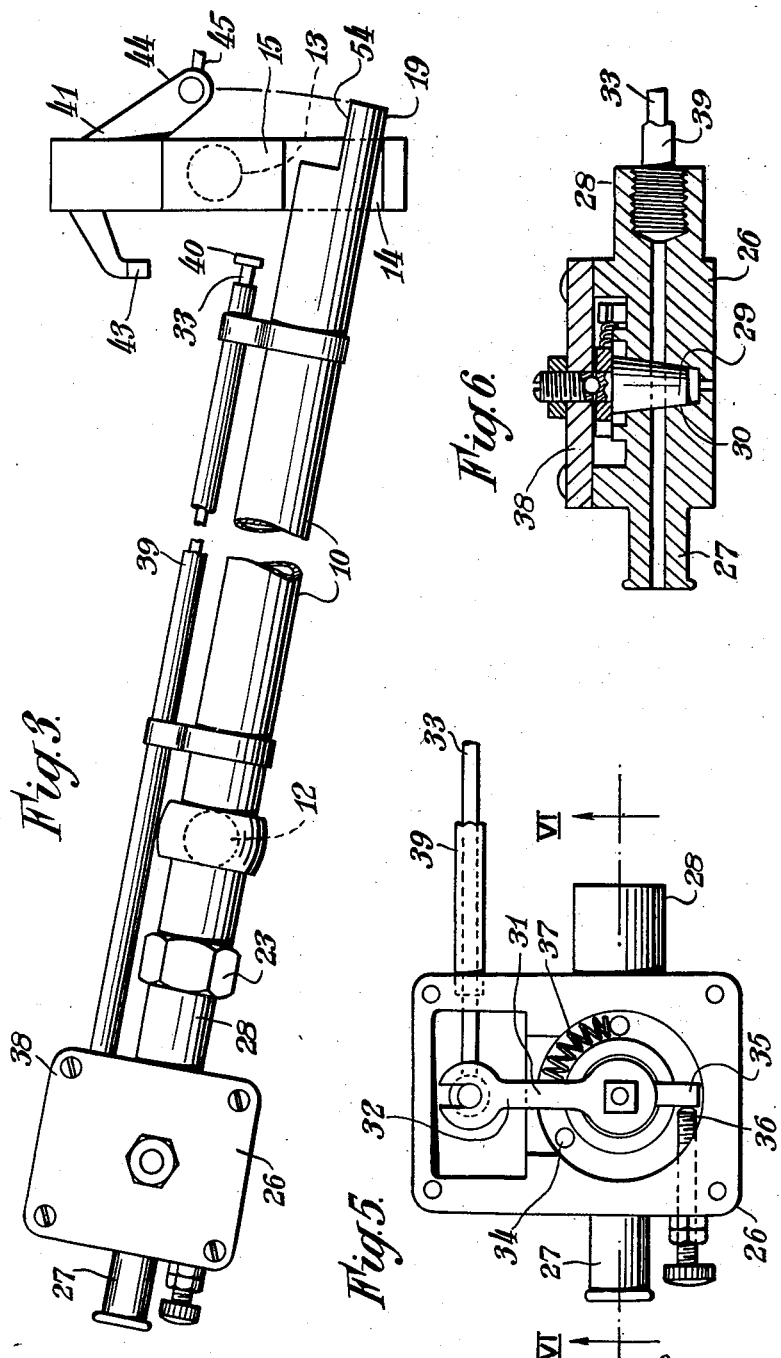

Patented Aug. 17, 1948

2,447,180

UNITED STATES PATENT OFFICE 2,447,180

STOCK FEEDING MECHANISM FOR LATHES

John George Horrigan, London, England, assignor of one-half to Bertie Alfred Pettitt, Stanmore, England Application October 2, 1944, Serial No. 556,826 In Great Britain October 21, 1943

2 Claims. (Cl. 29—59)

This invention relates to stock feeding mechanism for capstan and turret lathes, or automatic machines, for example, automatic screw-cutting machines, of the type wherein bar or similar stock is fed axially through a hollow headstock spindle to enable repetition work to be carried out. The stock is usually held at the headstock by a split-collet type chuck.

In known mechanism of this type the stock has been fed through the hollow headstock spindle by wire-feed mechanism which has sometimes comprised wires, ropes or cords disposed around pulleys and operated upon by weighted members so as to propel the stock to which they are connected directly, or indirectly through the medium of other devices, axially through the hollow spindle when the chuck is released.

It has also been previously proposed to advance the stock bar through a feed tube by the agency of compressed air acting upon a plunger within the feed tube.

One object of the present invention is to provide improved mechanism of the type described.

A further object of the invention is to provide apparatus using a feed tube for the stock and pressure fluid for feeding the stock through the tube in which the pressure fluid supply is automatically cut off when new stock is being fed into the feed tube.

One form of the invention is illustrated in the accompanying drawings, wherein:

Fig. 1 is a side elevation, partly in section;

Fig. 2 is a plan;

Fig. 3 is a plan view similar to Fig. 2, but showing the stock tube in the charging position;

Fig. 4 is a cross-sectional elevation taken on line IV—IV of Fig. 2;

Fig. 5 is an enlarged plan view of the nozzle device, with the cover removed; and Fig. 6 is a sectional elevation taken on line VI—VI of Fig. 5.

A tubular member 10, hereinafter referred to as the stock tube, is mounted on suitable pillars so as to be held in axial alignment with the hollow headstock spindle 11 of a capstan or turret lathe, automatic machine or the like, hereinafter referred to as the machine. The stock tube 10 is mounted on two pillars 12 and 13, the pillar 13 adjacent the headstock 11 being of a type whereby the end of the stock tube 10 may be moved to one side of the headstock to allow stock to be inserted into the tube; the other pillar 12 is suitably constructed to rotate on a vertical axis to allow such sideways movement of the stock tube. For example, the pillar 13 is provided with an elongated saddle 14 of channel formation in which the stock tube 10 is supported; when the tube 10 is disposed at one end of the saddle 14, as shown in Figs. 2 and 4, the tube is in alignment with the headstock spindle; when the tube is disposed at the other end of the saddle, as shown in Fig. 3, the tube is out of alignment with the headstock spindle and is then adapted to receive a new length of stock as hereinafter described. A bar or flange 15 may extend partially or wholly across the top of the saddle 14 to prevent the stock tube 10 lifting. The pillar 12 may provide a socket 16 for a vertical spigot 17, the spigot being provided on its upper end with a collar 18; the spigot 17 may rotate in the socket 16. The end 19 of the stock tube 10 adjacent the headstock is open to enable stock to be passed therethrough into the tube, and to enable the stock to pass from the tube to the hollow headstock spindle 11.

An adaptor 20, having an axial passage 21 therethrough is provided with a flange 22 on one end adapted to be engaged by the flanged end of a nut 23, the said nut being screw-threaded internally to engage an external screw-thread on the end 24 of the stock tube remote from the headstock spindle 11, whereby the said adaptor 20 may be secured to the stock tube 10 with the passage 21 substantially in axial alignment with the said tube 10. The adaptor 20 is screw-threaded at its other end 25 to enable it to be connected to a fluid control box 26.

The control box 26 is provided with an inlet nozzle 27 to which a flexible or other air supply pipe may be connected, and an outlet nozzle 28 to which the adaptor 20 is connected. A conical valve 29 is disposed in a seating 30 in the box 26 whereby the through passage from the inlet nozzle 27 to the outlet nozzle 28 may be opened or closed or otherwise controlled. The valve 29 is mounted on a lever 31, intermediately of the ends of said lever, one arm 32 of the said lever being connected to an operating rod 33 and being adapted to engage a fixed stop 34, the other arm 35 of the lever being adapted to engage an adjustable stop 36. When the arm 32 engages the stop 34 the valve 29 will close the passage through control box 26. The said passage is opened by pulling the rod 33 and the extent to which the said passage may be opened will be determined by the engagement of the arm 35 with the adjustable stop 36. A compression spring 37 also engages the arm 32 to return the lever 31 and valve 29 to the closed position when the rod 33 is released. The box is provided with a cover 38.

The operating rod 33 passes through a tube 39 rigidly secured by brackets to the stock tube 10 so as to move therewith and is provided at its end near the headstock spindle with a head 40. A bell crank-lever 41 is mounted on a pivot 42 on the saddle 14, one end 43 of said lever being of hook formation adapted to embrace partially the rod 33 immediately behind the head 40 in such a manner that when the lever 41 is operated the end 43 will engage the head 40 of the rod 33 and said rod will be pulled so as to operate the valve 29 in the control box 26. The hooked end 43 of the lever 41 is open at one side so that when the stock tube 10 together with the rod 33 and the tube 39 therefor are moved to one side in the saddle 14 so that the stock tube 10 is out of axial alignment with the headstock spindle 11, the rod 33 is moved out of engagement with the lever 41. The other end 44 of the lever 41 is connected to a rod 45 which is in turn connected to a bracket or clip 46 secured to the handle 47 on the machine which is adapted, when operated, to open or close the collet which holds the stock in the machine. Suitably, the rod 45 passes freely through a rotatable bush 48 in the end 44 of the lever 41, and the rod is provided with an adjustable collar 49 whereby the amount of movement which can be given to the handle 47 before the lever 41 is operated may be adjusted. When the handle 47 is moved in the direction of the arrow A to open the collet in the machine, the lever 41 is operated to pull the rod 33 and so open the valve 29; when the handle 47 is moved in the opposite direction to close the collet the rod 33 is released and the valve 29 closed.

A rod 50, adapted to form a free piston, is disposed within the stock tube 10 and is adapted to be forced along the said stock tube by pneumatic pressure when fluid, allowed to enter the stock tube through the control box 26, acts upon the adjacent end 53 of the said piston. The other end 51 of the piston 50 is adapted to engage the end of the stock bar 52 and may be recessed to facilitate this engagement. The length of the piston is such that when the forward end 51 has passed out of the open end 19 of the stock tube 10, through the hollow headstock spindle 11, and is adjacent to the chuck of the machine, the rear end 53 is disposed outside the headstock spindle so that the piston may be easily withdrawn therefrom. The end 19 of the stock tube 10 may be cut away longitudinally along one side as shown at 54, so that when the stock tube is moved to the position shown in Fig. 3 for the insertion of a new stock piece, the piston 50, then disposed mainly within the headstock spindle 11 but probably having its rear end 53 still disposed within the tube 10, will not prevent such movement of the stock tube.

In use, a stock bar 52 upon which operations are to be effected in the machine, is passed into the stock tube 10 from the open end 19, when the tube is in the position shown in Fig. 3, and thereby presses the piston 50 towards the rear end 24 of the stock tube. If a stock bar has already been operated upon and the piston 50 is disposed within the headstock spindle 11, the piston is withdrawn manually from said spindle and placed into the stock tube 10 before the new stock bar is placed in the tube 10. The stock tube is swung back to the position shown in Fig. 2, whereby the bell-crank lever 41 engages the rod 33. The handle 47 is operated to open the spring collet of the machine and at the same time the rod 33 is pulled by the handle 47 to place the valve 29 in the open position. Compressed air passes through the valve 29 to the stock tube 10 and presses the piston 50 forward, thereby forcing the stock bar through the headstock spindle 11, through the open collet and up to the tail stop on the capstan, turret or other part of the machine. The handle 47 is again operated to close the collet whereby the collet grips the stock bar, and at the same time the rod 33 is released and the spring 37 moves the valve 29 to the closed position thereby shutting off the supply of air to the stock tube. The operations are then effected on the stock bar. When the work piece has been parted off the stock, the collet is opened, by operating the handle 47, the valve 29 is again opened and the stock bar is fed forward again up to the tail stop. These operations are continued until the whole of the bar has been operated upon.

The stock may, of course, be a tube, and will be operated upon in a similar manner to a solid bar.

When the stock tube 10 is moved to the position shown in Fig. 3 to enable a new stock bar to be fed thereinto, the rod 33 is disconnected from the bell crank-lever 41 in the manner hereinbefore described. Thereby, should the handle 47 be operated whilst the stock tube is in the position indicated, the rod 33 will not be pulled and the valve 29 will not be opened; consequently, any possibility of the valve being opened to allow air to pass into the stock tube and project the piston 50 and/or the stock bar out of the stock tube when the said tube is not in alignment with the hollow headstock spindle is avoided.

In a modified method of operating the valve through which fluid is allowed to enter the stock tube, the handle 47 is connected to the valve by a flexible rod or wire so that when the handle is operated to open the collet the valve is pulled into the open position. The stock tube 10 may be prevented from being moved sideways in the saddle 14 to move it out of alignment with the head stock spindle, by a vertical pin which passes through the saddle to one side of the tube 10; the valve operating rod or wire may also pass round said pin, the pin causing the rod or wire to bend between the handle 47 and the valve. When the pin is removed to allow the tube 10 to be moved sideways, the rod or wire will also be released, and any movement of the handle 47 will merely cause the rod or wire to straighten out without operating the valve.

Whilst the construction described employs pneumatic fluid, it is obvious that hydraulic fluid may be employed, a suitable nozzle and associated members being employed.

What I claim and desire to secure by Letters Patent is:

1. Stock feeding mechanism for lathes, of the type that include a hollow headstock spindle and a collet, said mechanism comprising a stock tube, means supporting said stock tube for angular movement from a working position in axial registry with the hollow headstock spindle to a loading position out of registry with the hollow headstock spindle, a piston-like member disposed within said tube, said tube being open at its end adjacent the headstock spindle, conduit means for connecting a source of fluid under pressure to the other end of the said tube, a normally closed valve in said conduit means, control means for opening said valve to control the supply of fluid to said tubular member, a part of said control means being pivoted to the machine and another part of said control means being mounted on said stock tube for movement therewith, a first interlocking element on the part of the control means that is mounted on the stock tube, a second interlocking element on the part of the control means that is pivoted to the machine, said second interlocking element lying in the path of movement of said first interlocking element as the latter moves into working position, said elements mutually interlocking in the working position to render the valve operating means operable and automatically disconnecting in the loading position whereby the valve is closed in that position, a control member for opening and closing the collet of the machine, means connecting said control member to that part of the control means which is mounted on the machine.

2. Stock feeding mechanism according to claim 1 wherein the part of the valve control means mounted on and moving with the stock tube comprises a connecting rod connected to the valve to actuate the same, and the other part of the valve control means comprises a lever actuated by the control member through the means connecting the control member to said lever, the first interlocking element comprising a head on said connecting rod and the second interlocking element comprising a projection on said lever engaging said head when the stock tube is in its working position.

JOHN GEORGE HORRIGAN.

REFERENCES CITED

The following references are of record in the file of this patent:

UNITED STATES PATENTS

| Number | Name | Date |
| --- | --- | --- |
| 714,895 | Hanson | Dec. 2, 1902 |
| 2,003,152 | Lange et al. | May 28, 1935 |
| 2,300,457 | Mariotte | Nov. 3, 1942 |

FOREIGN PATENTS

| Number | Country | Date |
| --- | --- | --- |
| 116,896 | Australia | Apr. 27, 1942 |